(12) United States Patent
Ye et al.

(10) Patent No.: US 12,333,186 B2
(45) Date of Patent: Jun. 17, 2025

(54) SYSTEMS AND METHODS FOR CONTINUOUS IN-MEMORY VERSIONING

(71) Applicant: Micron Technology, Inc., Boise, ID (US)

(72) Inventors: Haojie Ye, Ann Arbor, MI (US); David Andrew Roberts, Wellesley, MA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/972,822

(22) Filed: Oct. 25, 2022

(65) Prior Publication Data
US 2024/0134566 A1 Apr. 25, 2024
US 2024/0231684 A9 Jul. 11, 2024

(51) Int. Cl.
*G06F 3/06* (2006.01)

(52) U.S. Cl.
CPC .......... *G06F 3/0659* (2013.01); *G06F 3/0607* (2013.01); *G06F 3/0679* (2013.01)

(58) Field of Classification Search
CPC ............. H04L 67/1097; H04L 67/1001; H04L 67/1091; H04L 67/568; G06F 3/0659; G06F 3/0607; G06F 3/0679
See application file for complete search history.

(56) References Cited

U.S. PATENT DOCUMENTS

| | | | |
|---|---|---|---|
| 9,559,889 B1 * | 1/2017 | Vincent | H04L 67/568 |
| 11,586,385 B1 * | 2/2023 | Lercari | G06F 1/30 |
| 2016/0170885 A1 * | 6/2016 | Salyers | G06F 3/0685 |
| | | | 711/123 |

OTHER PUBLICATIONS

Bhattacharyya, Abhishek, "NvMR: Non-Volatile Memory Renaming for Intermilent Computing", 2022 Association for Computing Machinery Acm Isbn, (Jun. 18-22, 2022), 13 pages.

* cited by examiner

*Primary Examiner* — Ernest Unelus
(74) *Attorney, Agent, or Firm* — Schwegman Lundberg & Woessner, P.A.

(57) ABSTRACT

Devices and techniques for continuous in-memory versioning are described herein. A memory subsystem includes a memory device configured to store a first data unit, a second data unit, and a third data unit, wherein the first, second, and third data units have a set of physical memory locations on the memory device, and metadata associated with the first, second, and third data units, the metadata including state information and a dirty commit timestamp; and a processing device, operatively coupled to the memory device, the processing device configured to: receive, from a host system, a first memory command associated with a logical memory address, the logical memory address mapped to the set of physical memory locations of the memory device; and in response to receiving the first memory command, perform a data operation on the first, second, or third data unit based on the state information and the dirty commit timestamp.

23 Claims, 8 Drawing Sheets

SYSTEMS AND METHODS FOR CONTINUOUS IN-MEMORY VERSIONING

BACKGROUND

Memory devices for computers or other electronic devices can be generally categorized as either volatile or non-volatile memory. Volatile memory requires power to maintain its data. Examples include random-access memory (RAM), dynamic random-access memory (DRAM), or synchronous dynamic random-access memory (SDRAM), among others. Non-volatile memory can retain stored data when not powered, and includes flash memory, read-only memory (ROM), electrically erasable programmable ROM (EEPROM), static RAM (SRAM), erasable programmable ROM (EPROM), resistance variable memory, phase-change memory, storage class memory, resistive random-access memory (RRAM), and magnetoresistive random-access memory (MRAM), among others. Persistent memory is a type of non-volatile memory that is characterized as byte addressable low-latency memory. Examples of persistent memory can include Non-volatile Dynamic Inline Memory Modules (NVDIMM), phase-change memory, storage class memory, and the like.

A memory subsystem can include one or more memory devices that store data. In general, a host system can utilize a memory subsystem to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

To easily identify the discussion of any particular element or act, the most significant digit or digits in a reference number refer to the figure number in which that element is first introduced.

DETAILED DESCRIPTION

Figure 1:
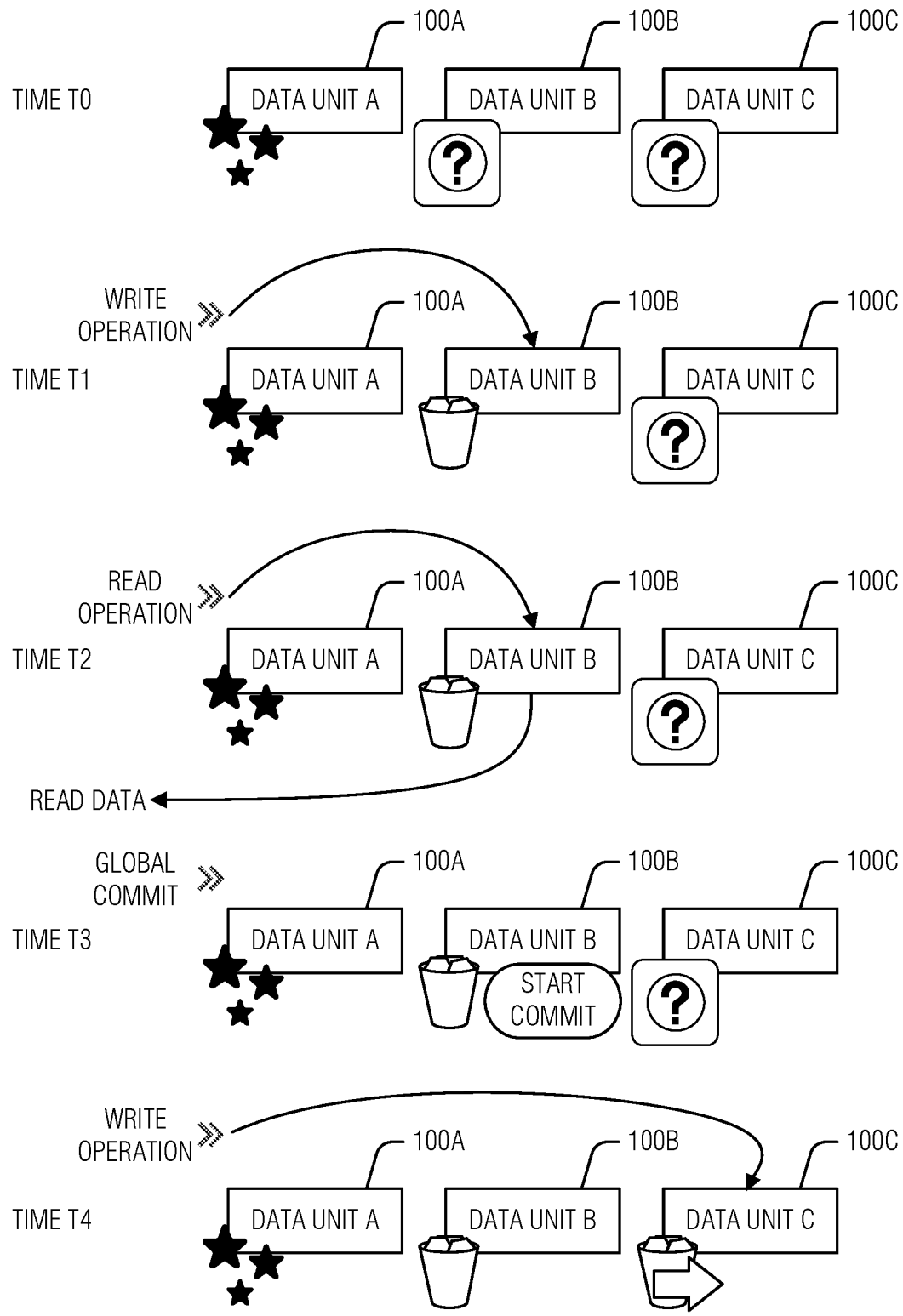
FIG. 1 is a diagram illustrating data units and their changing state over time, according to embodiments.

Aspects of the present disclosure are directed to versioning data stored on a memory device, which can be part of a memory subsystem. The versioning can enable the memory device to maintain different versions of data within a set of physical memory locations (e.g., a row) of the memory device. This facilitates checkpoint (commit) and rollback operations on the memory device. A memory device can be a storage device, a memory module, or a hybrid of a storage device and memory module. Examples of storage devices and memory modules are described below in conjunction with FIG. 1.

In general, a host system can utilize a memory subsystem that includes one or more components, such as memory devices that store data. The host system can send access requests to the memory subsystem, such as a write memory command to store data at the memory subsystem and a read command to read data from the memory subsystem.

A read or write command includes logical address information (e.g., logical block address (LBA), namespace), which is the location the host system associates with the host data. The logical address information (e.g., LBA, namespace) can be part of metadata for the host data. Metadata can also include error handling data (e.g., error-correcting code (ECC) codeword, parity code), data version (e.g., used to distinguish age of data written), valid bitmap (which LBAs or logical transfer units contain valid data), and so forth.

In prior memory versioning systems, when a global checkpoint command is issued to cause a checkpoint for all cache line blocks, writes had to be suspended for the duration of the checkpoint operation. Aspects of the present disclosure address this and other deficiencies by versioning data stored on a memory device using three blocks. It allows continued program execution during the atomic metadata updates conducted in the checkpoint operation. Software can continue and execute speculatively during metadata updates, while still being able to roll back to the known good checkpointed state if an error has been detected at any point, even during the commit of a checkpoint.

The present systems and methods provide for in-memory versioning using a set of three memory blocks that are managed to provide memory checkpoints. A checkpoint, as used herein, is a state where data in memory is considered to be in a known good state. Software or hardware that relies on the data is assured that the data is uncorrupted and clean. The systems and mechanisms described herein use three blocks: one to store a checkpointed version of data, one to store dirty (updated) data, and one to store speculative or prospective data. The block storing the checkpointed version is used as a rollback option in the case of data corruption or other failure conditions caused by data stored in the dirty data block or the speculative data block. The dirty and speculative data blocks are described in more detail below, but in short, they are used to store writes temporarily before or during a checkpoint operation, respectively. When a checkpoint operation is successfully completed, the dirty block is assigned as the new checkpoint clean block, the speculative data block can be used as the new dirty block, and the previously-assigned checkpoint clean block can be reused as place to store speculative data during the next checkpoint operation.

Various embodiments eliminate the overhead of atomic global synchronization of all metadata state changes associated with in-place data versioning and rollback in hardware. When committing checkpoints of memory, the system can still proceed and execute read and write operations speculatively without any interrupts while performing atomic metadata updates. The design provides the ability to roll back to the known good checkpointed state if an error has been detected at any point.

Though various embodiments are described herein with respect to an in-memory versioning (IMV) controller, other embodiments can implement features described herein (e.g., operations for rollback, speculative writes, checkpoint) that are implemented by way of a different part of a memory device (e.g., a controller, processor, or state machine of a memory die). For instance, various embodiments can implement versioning operations as part of a controller, processor, or state machine for each bank within a memory device. Additional details are set forth below.

FIG. 1 is a diagram illustrating data units 110A, 100B, 100C and their changing state over time, according to embodiments. For the purposes of this discussion, the data units 100A-C are containers of data. The data units 100A-C can be of any size, such as 32-bytes each, 64-bytes each, etc. The data units 100A-C are used together to provide data versioning.

At some point in time t0, the data units 100A-C are configured to store data that has been committed (checkpointed) in data unit 100A. Committing or checkpointing data in the context of this disclosure is when data is successfully written out of a processor's cache (e.g., L1, L2, L3 cache) to a block in main memory and changing the state of the block to indicate that the write was successful. As such, at least data unit 100A has a copy of clean, committed data. Data units 100B and 100C can be clean copies or can have indeterminate data. Data unit 100B is assigned to be the block to store dirty data and data unit 100C is assigned to be the block to store speculative data (described later). As will be described further, the arrangement and labels of the data units 100A-C is merely for illustration and as time progresses, the roles of each data unit 100A-C is rotated.

At time t1, a write operation is received from a host and the new or revised data is stored in data unit 100B. This is now considered a dirty data unit.

At time t2, a read operation is received from the host. Instead of providing the host the data from data unit 100A, which is stale, the data from data unit 100B is returned to the host in response to the read operation.

At time t3, a global commit operation is issued. The global commit operation can be issued by the host. Alternatively, the global commit operation can be part of a refresh operation (e.g., DRAM refresh operation) being performed (e.g., periodically) on memory addresses. To commit the data in the dirty data unit 100B, the dirty data unit is to update its metadata, which includes storing a timestamp of the commit.

At time t4, a write operation is received from the host with data to be stored. However, because the write operation is during the global commit operation, the dirty data unit 100B can be presently in the process of updating its metadata. In this case, the write is treated as a speculative write that can be committed at a later time. The data for the speculative write is stored in a speculative data unit 100C.

Depending on the time when the write operation is received in comparison to the timestamp of the commit for the dirty data unit 100B, different actions are taken for different data units 100A-C.

If the timestamp of the commit is before the write operation, then the dirty data unit 100B can be considered checkpointed and its data is committed. In that case, the write operation can be treated as updating or creating a new dirty data unit and data unit 100C is marked as a dirty data unit. Going forward in time, the data unit 100A is used as the speculative data unit for the next set of transactions.

However, if the timestamp of the commit is after the write operation, meaning that the dirty data unit 100B started to update its metadata but was not finished before the write operation occurred, then the data in both the dirty data unit 100B and in the speculative data unit 100C are invalid. The host was writing new data and it will not be captured correctly because the dirty data was not yet committed before the write occurred. In that case, a rollback operation is used to restore to the last known good state, that of the data in data unit 100A.

A similar mechanism can be used when a failure condition is detected, such as a heartbeat missing, a software error detected, etc. In that case, uncommitted data can be rolled back to the last known good state. The failure can occur during a global checkpoint command.

Figure 2:
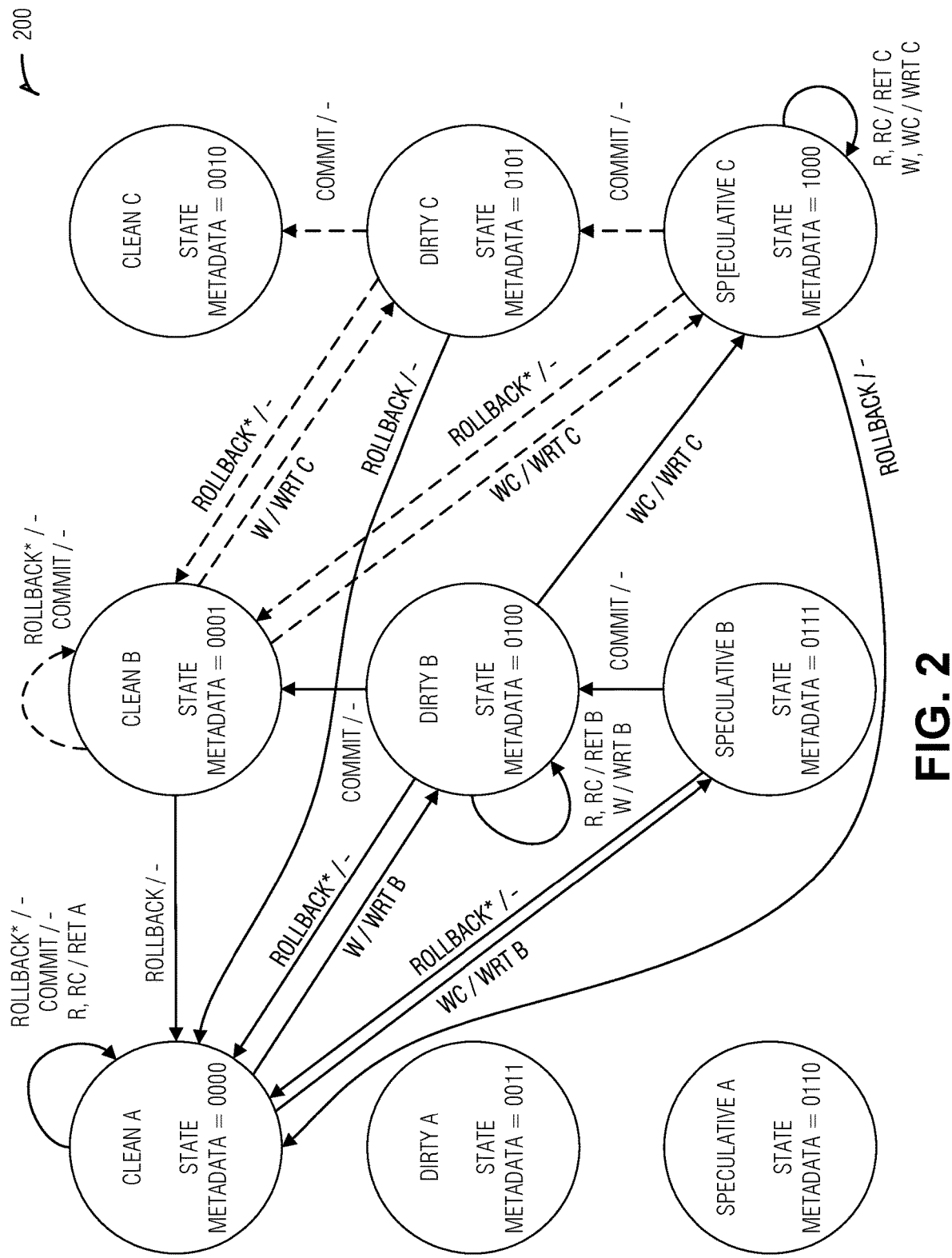
FIG. 2 is a diagram illustrating an in-memory versioning (IMV) controller state diagram, according to embodiments.

FIG. 2 is a diagram illustrating an in-memory versioning (IMV) controller state diagram 200, according to embodiments. Data units (e.g., cache line-sized blocks) are represented as A, B, and C. All of the data units A, B, and C are associated with the same logical memory address allocated by the host processor. A, B, and C can be physically located separately on the same or different memory devices in a memory subsystem. The size of the data unit (e.g., cache line size) can be externally configurable.

The host interacts with an IMV controller using normal cache line read and write operations. Additionally, the host can issue commit and rollback operations.

There are three types of commit events in the system that are used in the IMV controller state diagram 200: a global commit operation, a local commit event, and a dirty commit. A global commit operation is a command issued by a program executing on the host system, where the program requests that all of its memory state (written data) be recorded in a consistent state. A local commit event is triggered for each data unit after a global commit operation is started by software. A dirty commit is a commit event for a data unit (e.g., cache line) when the data unit is in either a "dirty state" or a "speculative (spec) state".

The following operations update the state of each logical data unit.

R/W: Normal read and write operations while no global commit operation is in progress.

RC/WC: (Read during Commit/Write during Commit) Speculative read and write operations that occur while a global commit is taking place.

Dirty Commit: checkpoint commit operation on the local data unit to update its local metadata state information. The dirty commits can occur asynchronously with the global commit operation and with other dirty commit operations of other data units.

Rollback*: This is a rollback event that is in response to a failure event occurring that has a timestamp greater than or equal to the last dirty commit timestamp in a data unit.

Rollback: This is a rollback event that is in response to a failure event occurring that has a timestamp less than the last dirty commit timestamp in a data unit.

The host can send a global commit command establishing a global commit timestamp. The global commit command is broadcasted to IMV state machines responsible for all the data units in the memory device(s) under IMV control. Each data unit in the memory device is sent a commit request to trigger the local data unit commit event asynchronously with the global commit command. Any read (R) or write (W) requests to the data units after the global commit broadcast signal can speculatively execute, regardless of the order of the local per-data unit commit events. However, R and W requests are replaced by the IMV state machine with RC or WC if they occur between the start and end of a global commit operation. After each local commit event finishes, the dirty commit timestamp is updated asynchronously to the global commit operation. In an embodiment, the local commit transaction is two-steps: changing the state metadata and saving the dirty commit timestamp. The dirty commit timestamp can be of various sizes, depending on the microarchitecture used. For instance, the dirty commit timestamp can be 7 to 13 bytes, 19 to 32 bytes, or other sizes.

When a global commit operation is started, a local commit counter is initialized to the number of data units under control by the IMV controller. After each data unit has finished its metadata update, the local commit counter is decremented. The metadata update includes at least storing a dirty commit timestamp for any dirty or speculative data units that process a local commit event.

A non-zero local commit counter value indicates that a global commit is still in progress. Another global commit command can only issue when the local commit counter indicates that all the data units have finished their metadata updates in the previous checkpoint interval. When there is no global commit operation taking place, RC/WC events are considered normal R/W events.

The state transitions are denoted with an event and an operation, separated by a "/". State transitions can trigger operations to write or read from memory devices, for example.

In addition to data storage for three data unit-sized blocks (A, B, C) per physical data unit (e.g., cache line) address, there are four hidden state bits (metadata) to indicate one of the nine possible states shown in FIG. 2. An example 4-bit state encoding is illustrated in FIG. 2 for each of the states; however, it is understood that any encoding can be used.

The state diagram 200 is fully symmetric with respect to A, B, and C. Note that state transactions that are symmetric with others are either shown in dash lines or not shown (e.g., Spec B on a Rollback, does no operation and transits to Clean C; Clean C on a WC, writes to Clean A and transits to Spec A, etc.). The dashed lines also show examples of the not shown transitions of the state diagram.

After issuing a rollback command, the memory state reverts to the last known good state after applying transitions in the state diagram shown above for every cache line.

The global commit and rollback commands can either be encoded as entirely new bus commands, with or without a range of addresses specified, or they can be invoked via reserved memory-mapped external Command and Status registers (CSR).

Example Operations

Because the starting state of a data unit can be any of these three states, Clean A, Clean B, or Clean C, we simplify the discussion by denoting current state as "X" where X can be A, B or C. Also, because of the way the states are rotated and reused, if X=A, (X+1)=B; (X−1)=C, and (X−2)=B. Further, X+1 is the same as X−2 because the state diagram is fully symmetric with respect to A, B and C.

Starting State Clean X:

On R/RC, the data value returns from X. The next state is the clean X state.

On W, the data value writes to data unit X+1. The next state is the dirty (X+1) state.

On WC, the data value writes to data unit X+1. The next state is the speculative (X+1) state.

On commit, no operation. The next state is the clean X state.

On Rollback*, no operation is performed. The next state is the clean X state.

On Rollback, (this indicates that a dirty X state has been committed locally, so the state has transitioned to a clean X, and an error has been detected during the global commit operation), the memory state needs to roll back to a previous clean version before the local commit. No operation is performed. The next state is the clean (X−1) state.

Starting state Dirty X:

On R/RC, the data value returns from data unit X. The next state is the dirty X state.

On W, the data value writes to data unit X. The next state is the dirty X state.

On WC, the data value writes to data unit X+1. The next state is the speculative (X+1) state.

On commit, no operation. The next state is the clean X state.

On Rollback*, no operation is performed. The next state is the clean (X−1) state.

On Rollback, no operation is performed. The next state is the clean (X−2) state.

Starting State Spec X:

On R/RC, the data value returns from data unit X. The next state is the spec X state.

On W, the data value writes to data unit X. The next state is the spec X state.

On WC, the data value writes to data unit X. The next state is the spec X state.

On commit, no operation. The next state is the dirty X state.

On Rollback*, no operation is performed. The next state is the clean (X−1) state.

On Rollback, no operation is performed. The next state is the clean (X−2) state.

Figure 3:
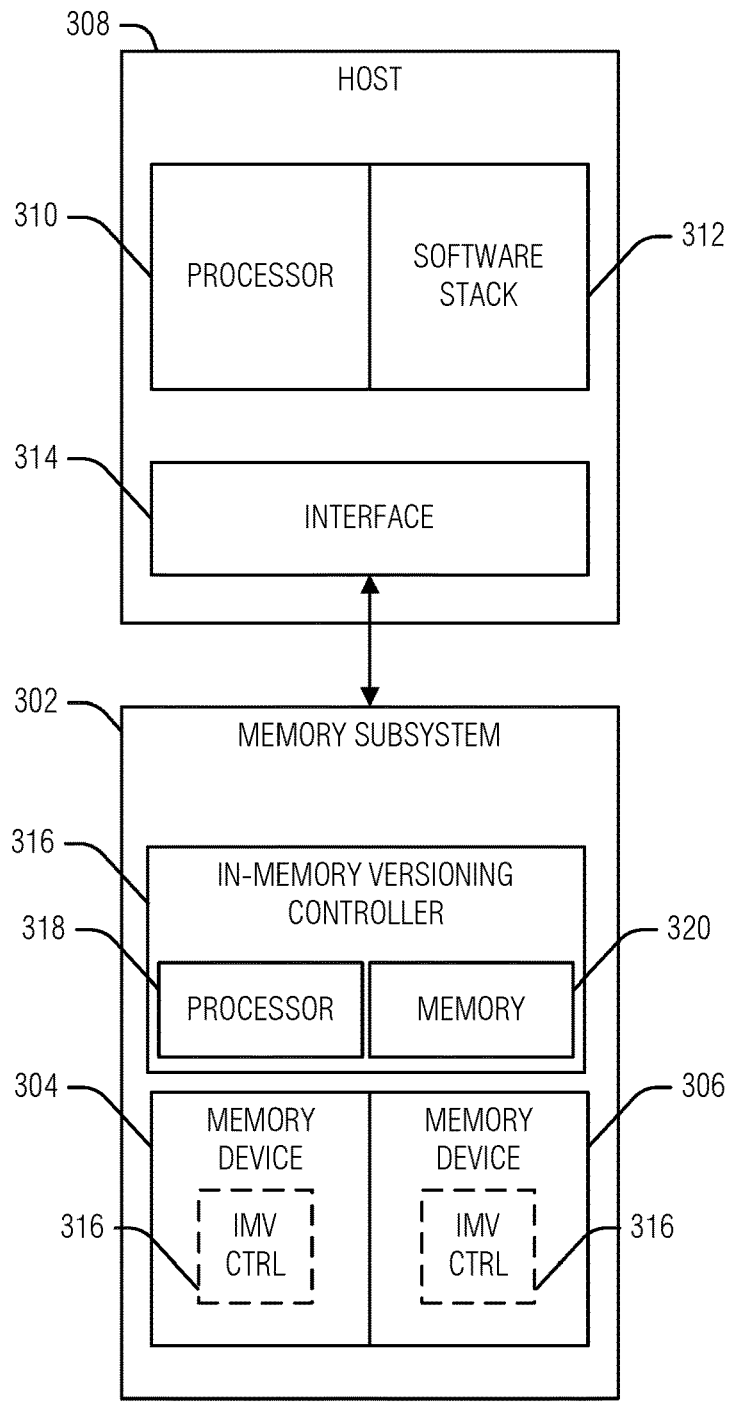
FIG. 3 illustrates an example computing system that includes a memory subsystem, according to embodiments.

FIG. 3 illustrates an example computing system 300 that includes a memory subsystem 302, according to embodiments. The memory subsystem 302 can include media, such as one or more volatile memory devices (e.g., memory device 304), one or more non-volatile memory devices (e.g., memory device 306), or a combination of such. For instance, a desktop computer can have two DDR modules installed to interface with a host processor.

The computing system 300 can be a computing device or a processing device, such as a desktop computer, a laptop computer, a network server, a mobile device, a vehicle (e.g., airplane, drone, train, automobile), an Internet of Things (IoT) enabled device, an embedded computer (e.g., one included in a vehicle, industrial equipment, or a networked commercial device), or the like.

The computing system 300 can include a host system 308 that is coupled to one or more memory subsystems 302. In some embodiments, the host system 308 is coupled to different types of memory subsystems 302. FIG. 3 illustrates one example of a host system 308 coupled to one memory subsystem 302. As used herein, "coupled to" or "coupled with" generally refers to a connection between components, which can be an indirect communicative connection or direct communicative connection (e.g., without intervening components), whether wired or wireless, including connections such as electrical, optical, magnetic, or the like.

The host system 308 can include a processor chipset 310 and a software stack 312 executed by the processor chipset. The processor chipset 310 can include one or more cores, one or more caches, a memory controller (e.g., NVDIMM controller), and a storage protocol controller (e.g., a peripheral component interconnect express (PCIe) controller, serial advanced technology attachment (SATA) controller). The host system 308 uses the memory subsystem 302, for example, to write data to the memory devices 304, 306 and read data from the memory devices 304, 306.

The host system 308 can be coupled to the memory subsystem 302 via a physical host interface 314. Examples of a physical host interface 314 include, but are not limited to, a SATA interface, a peripheral component interconnect express (PCIe) interface, universal serial bus (USB) interface, Fibre Channel, Serial Attached SCSI (SAS), Small Computer System Interface (SCSI), a double data rate (DDR) memory bus, a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), or any other interface. The physical host interface 314 can be used to transmit data between the host system 308 and the memory subsystem 302. The host system 308 can further utilize an NVM Express (NVMe) interface to access components (e.g., memory devices 306) when the memory subsystem 302 is coupled with the host system 308 by the PCIe interface. The physical host interface 314 can provide an interface for passing control, address, data, and other signals between the memory subsystem 302 and the host system 308. In general, the host system 308 can access multiple memory subsystems 302 via a same communication connection, multiple separate communication connections, and/or a combination of communication connections.

The memory subsystem 302 can include a storage device, a memory module, or a hybrid of a storage device and memory module. Examples of a storage device include a solid-state drive (SSD), a flash drive, a universal serial bus (USB) flash drive, a secure digital (SD) card, an embedded Multi-Media Controller (eMMC) drive, a Universal Flash Storage (UFS) drive, and a hard disk drive (HDD). Examples of memory modules include a dual in-line memory module (DIMM), a small outline DIMM (SO-DIMM), and various types of non-volatile dual in-line memory module (NVDIMM).

The memory devices 304, 306 can include any combination of the different types of non-volatile memory devices and/or volatile memory devices. The volatile memory devices (e.g., memory device 304) can be, but are not limited to, random access memory (RAM), such as dynamic random access memory (DRAM) and synchronous dynamic random access memory (SDRAM).

A non-volatile memory device (e.g., memory device 306) is a package of one or more die. Each die can be comprised of one or more planes. For some types of non-volatile memory devices (e.g., negative-and (NAND)-type devices), each plane is comprised of a set of physical blocks. For some memory devices, blocks are the smallest area that can be erased. Each block is comprised of a set of pages. Each page is comprised of a set of memory cells, which store bits of data. Some examples of non-volatile memory devices (e.g., memory device 306) include a negative-and (NAND) type flash memory and write-in-place memory, such as a three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 306 can include one or more arrays of memory cells. One type of memory cell, for example, single-level cells (SLCs), can store one bit per cell. Other types of memory cells, such as multi-level cells (MLCs), TLCs, quad-level cells (QLCs), and penta-level cells (PLCs), can store multiple bits per cell. In some embodiments, a non-volatile memory device (e.g., memory device 306) can include one or more arrays of memory cells such as SLCs, MLCs, TLCs, QLCs, or any combination of such. In some embodiments, a particular memory device can include an SLC portion, and an MLC portion, a TLC portion, or a QLC portion of memory cells. The memory cells of the memory devices 306 can be grouped as pages that can refer to a logical unit of the memory device used to store data. With some types of memory (e.g., NAND), pages can be grouped to form blocks.

Although non-volatile memory components such as NAND type flash memory (e.g., 2D NAND, 3D NAND) and 3D cross-point array of non-volatile memory cells are described, the memory devices 304, 306 can be based on any other type of non-volatile memory, such as read-only memory (ROM), phase change memory (PCM), self-selecting memory, other chalcogenide-based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide-based RRAM (OxRAM), negative-or (NOR) flash memory, and electrically erasable programmable read-only memory (EEPROM).

An in-memory version (IMV) controller 316 can communicate with the memory devices 304, 306 to perform operations such as reading data, writing data, or erasing data at the memory devices 304, 306. The IMV controller 316 can include hardware such as one or more integrated circuits and/or discrete components, a buffer memory, or a combination thereof. The hardware can include digital circuitry with dedicated (i.e., hard-coded) logic to perform the operations described herein. The IMV controller 316 can be a microcontroller, special purpose logic circuitry (e.g., a field programmable gate array (FPGA), an application specific integrated circuit (ASIC), etc.), or other suitable processor. The IMV controller 316 can be integrated in a memory device 304, 306 (e.g., a memory module) and intercept read and write operations from a host to translate logical addresses to storage locations at physical addresses in banks in the module.

The IMV controller 316 can include a processor (e.g., processing device) 318 configured to execute instructions stored in local memory 320. In the illustrated example, the local memory 320 of the IMV controller 316 can include embedded memory configured to store instructions for performing various processes, operations, logic flows, and routines that control operation of the memory subsystem 302, including handling communications between the memory subsystem 302 and the host system 308. In some embodiments, the local memory 320 can include memory registers storing memory pointers, fetched data, and so forth. The local memory 320 can also include read-only memory (ROM) for storing microcode. The local memory 320 of the IMV controller 316 can be configured to store instructions for performing various methods and processes described herein.

In general, the IMV controller 316 can receive commands or operations from the host system 308 and can convert the commands or operations into instructions or appropriate commands to achieve the desired access to the memory devices 304, 306. The IMV controller 316 can be responsible for other operations such as wear leveling operations, garbage collection operations, error detection and error-correcting code (ECC) operations, encryption operations, caching operations, and address translations between a logical address (e.g., logical block address (LBA), namespace) and a physical memory address (e.g., physical block address) that are associated with the memory devices 304, 306. The IMV controller 316 can further include host interface circuitry to communicate with the host system 120 via the physical host interface. The host interface circuitry can convert the commands received from the host system 308 into command instructions to access the memory devices 304, 306 as well as convert responses associated with the memory devices 304, 306 into information for the host system 308.

The IMV controller 316 enables or facilitates versioning of data stored on the memory devices 304, 306 (e.g., maintaining versions of data stored on individual rows of the memory devices 304, 306). In embodiments, the host system 308 interacts with the IMV controller 316 using normal cache line read and write operations. The host system 308 issues read and write operations to a logical address, which the IMV controller 316 maps to three physical addresses on one or more of the memory device 304, 306. Additionally, the host system 308 can issue a commit function and a rollback function. As described above, the commit and rollback functions cause state changes that are recorded by the IMV controller 316. The state changes are used to determine which of the three data units is a clean, dirty, or speculative data unit. Based on the state changes and state metadata, the IMV controller 316 directs read and write operations to the appropriate data unit.

In embodiments, the IMV controller 316 enables the memory subsystem 302 to maintain different versions of data for different sets of physical memory locations (e.g., different rows) of one of the memory devices 304, 306. The IMV controller 316 can enable the memory subsystem 302 to use versioning stored data to facilitate a rollback operation/behavior, a checkpoint operation/behavior, or both as described herein with respect to an individual set of physical memory locations (e.g., row) of one of the memory devices 304, 306.

In embodiments, state data describing the state of a data unit can be saved as metadata (e.g., metadata bits) associated with the set of physical memory locations. The metadata can be stored in memory 320. Optionally, metadata can be stored on the set of physical memory locations (e.g., row) of the memory device (e.g., 304, 306) with (e.g., in-line with) the plurality of data units stored on the set of physical memory locations. For example, within a given row of the memory device (e.g., 304, 306), the metadata comprising state data can be stored in a first position (e.g., position zero) with a first data unit (e.g., first cache line), which can permit the metadata to be read from a row buffer concurrently with the first data unit.

In various embodiments, the number of data units per logical memory location is configurable, the size of each data unit is configurable, or both. In related embodiments, three 64-byte data units are stored in the same bank or two or three different banks of a memory device. The IMV controller 316 can facilitate configuration of the number of data units, the size of each data unit, or both. As such, it is understood that placing all three blocks in the same row buffer is just one illustrative example and that they can be placed anywhere in the memory system, but their addresses must be capable of being looked up as a function of the requested logical address from the host.

For some embodiments, versioning of stored data described herein is performed by way of memory address mapping (e.g., decoding) performed by the IMV controller 316. According to some embodiments, the IMV controller 316 maps (e.g., decodes) a single logical memory address to a set of physical memory locations (e.g., a single row), where the single logical memory address is used to access a single data unit (e.g., single cache line) of the plurality of data units (e.g., multiple cache lines) stored by the set of physical memory locations.

For instance, a memory address can map to an individual row of one of the memory devices 304, 306, where the individual row stores a plurality of cache lines, where a read memory command performed with respect to the memory address will read from only one of the cache lines of the plurality, and where a write memory command performed with respect to the memory address will write to only one of the cache lines of the plurality.

In an embodiment, the logical-to-physical mappings of each block (if they are not stored on the same row) are stored in a lookup table (LUT) handled by the IMV controller 316. A logical address provided by the host is used to lookup the one or more physical addresses of the blocks. Physical addresses may be arranged so that they are easily calculated from a logical address. For example, with a logical address X, physical addresses may be Metadata start address=(X+0), A=(X+1000), B=(X+2000), C=(X+3000).

In an embodiment, metadata can be co-located with the first data unit (e.g., block A), so that the first data unit is always loaded to access the metadata. In another embodiment, metadata is stored in a separate table (e.g., region of memory) independent of the data units (e.g., blocks A, B, C). The bits for adjacent blocks can be packed together in the table.

The IMV controller 316 is able to perform a checkpoint operation on one or more memory addresses on memory devices 304, 306 of the memory subsystem 302, and to perform a rollback operation of one or more memory addresses on memory devices 304, 306 of the memory subsystem 302. For some embodiments, the IMV controller 316 performs a commit checkpoint operation in response to a memory command, such as a global commit command, received from the host system 308. Additionally, for some embodiments, the IMV controller 316 performs a rollback operation in response to a memory command, such as a rollback command, received from the host system 308. A commit checkpoint operation, a rollback operation, or both can be performed on a single memory address that maps to a set of physical memory locations (e.g., row) or on a range of consecutive memory addresses that maps to multiple sets of physical memory locations (e.g., multiple rows). For some embodiments, the IMV controller 316 is able to perform a checkpoint operation on one or more memory addresses as part of a refresh operation (e.g., DRAM refresh operation) being performed (e.g., periodically) on those memory addresses.

A commit checkpoint memory command (e.g., global commit command from the host system 308) that causes the IMV controller 316 to perform a commit operation can comprise a memory command encoded as a bus command, which can have one or more memory addresses (e.g., a range of memory addresses) specified. Alternatively, the commit checkpoint operation can be invoked by the host system 308 by way of a register of the memory subsystem 302 (e.g., an external register, such as a CSR), and include communicating one or more memory addresses (e.g., a range of memory addresses) specified via one or more registers of the memory subsystem 302. Similarly, a rollback memory command (from the host system 308) that causes the IMV controller 316 to perform a rollback operation can comprise a memory command encoded as a bus command. The bus command can omit addresses, or can have one or more memory addresses (e.g., a range of memory addresses) specified. Alternatively, the rollback operation can be invoked by the host system 308 by way of a register of the memory subsystem 302 (e.g., an external register, such as a CSR), and include communicating one or more memory addresses (e.g., a range of memory addresses) specified via one or more registers of the memory subsystem 302.

Figure 4:
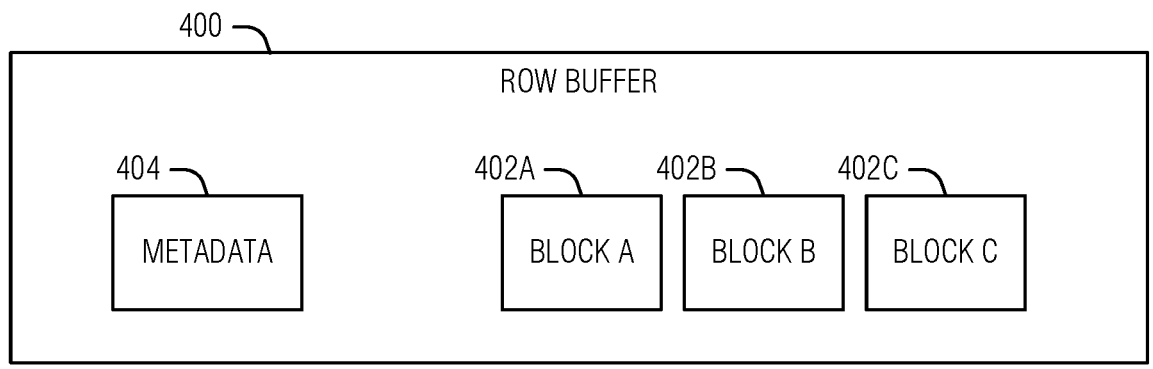
FIG. 4 is a block diagram illustrating a row buffer of a memory device, according to embodiments.

FIG. 4 is a block diagram illustrating a row buffer 400 of a memory device, according to embodiments. The row buffer 400 can be part of a memory device (e.g., 304, 306), and a given memory device can comprise a plurality of row buffers, with each row buffer being associated with a range of memory addresses or range of individual sets of physical memory locations (e.g., range of rows).

As illustrated, the row buffer 400 is configured to store three cache line sized blocks 402A, 402B, 402C that are being read from, or written to, an individual set of physical memory locations (e.g., an individual row). The cache line sized blocks 402A, 402B, 402C are associated with metadata 404 that stores versioning state data. The metadata 404 includes state metadata, such as illustrated in FIG. 2, to indicate the state of the finite state machine. The metadata 404 can also include a dirty commit timestamp to indicate the last time a dirty data unit successfully processed a local commit operation.

The cache line sized blocks 402A-C stored on the row buffer 400 are associated with an individual memory address allocated by a host processor (e.g., the individual row) of a memory device (e.g., 304, 306). The three cache line sized blocks 402A, 402B, 402C are used to represent a single data block (e.g., cache line) address in the system. These can exist in any physical location in a memory device(s) even though the example in FIG. 4 shows them in the same memory row. The cache line size can be externally configurable to support different sizes. The metadata 404 can be stored in the same or different memory device. Metadata bits can be cached for performance.

In the context of FIG. 4, performing a read operation (e.g., in response to a read memory command from a host system 120) can include reading data from one of the cache line sized blocks 402A-C based on the metadata 404 and providing the read data in response to the read operation. Performing a write operation (e.g., in response to a write memory command from a host system 120) can include writing data to one of the cache line sized blocks 402A-C based on the metadata 404 and the type of write command used. The setting of the metadata 404 through a local commit operation can be by way of an atomic (e.g., uninterruptable) operation.

Returning to FIG. 3, in an example, for a logical memory address mapping to a set of physical memory locations (e.g., row), the IMV controller 316 can perform a read operation (e.g., in response to a read memory command from the host system 308) by obtaining the metadata 404 and cache line sized blocks 402A-C in a row buffer for the blocks associated with the logical memory address, reading data from a cache line sized block 402A-C (e.g., cache line) identified by the state indicated in the metadata 404, and providing the read data in response to the read operation.

The IMV controller 316 can perform a write operation (e.g., in response to a write memory command from the host system 308) by obtaining the metadata 404 and cache line sized blocks 402A-C in a row buffer for the blocks associated with the logical memory address, determining which cache line sized block 402A-C is acting as the dirty cache line sized block 402A-C (based on the state indicated in the metadata 404) and then writing to that data unit. If the write operation occurs after a global commit operation, then the IMV controller 316 determines which cache line sized block 402A-C is acting as the speculative data unit using the metadata and directs the write operation to that cache line sized block 402A-C. After a write, the state encoding in the metadata 404 is updated to reflect the current state of the finite state machine. This can be, for example, "Dirty B" (e.g., state metadata 0100b) or "Spec C" (e.g., state metadata 1000b), depending on whether the write operation was issued before the global commit operation.

The IMV controller 316 can perform a checkpoint commit operation (e.g., in response to a global commit memory command from the host system 308). The metadata 404 is modified by saving a dirty commit timestamp to the metadata 404 and a 4-bit state encoding. The setting of the metadata can be by way of an atomic (e.g., uninterruptable) operation.

The IMV controller 316 can perform a rollback operation (e.g., in response to a rollback memory command from the host system 308). Depending on when the failure event causing the rollback command happened, the IMV controller can set the state encoding in the metadata 404 to revert to a previous version of data stored in a data unit by indicating that a "clean" cache line sized block 402A-C is the active block.

The state machine implemented via the IMV controller 316 hides stall time for metadata update of data units (e.g., cache lines). However, there is still a requirement to make all dirty cache lines in the host visible (e.g., write back) to main memory before a global commit starts. This is effectively a barrier operation that stalls the program executing at the host 308.

To reduce this latency, the host processor 310 can initiate a command to allow forward progress without flushing its caches on a global commit. The host processor 310 can issue a command to periodically scrub (e.g., force writeback) of dirty data from a processor cache to memory 304, 306, with a scrubbing frequency tuned to be close to that of when the global commit is issued.

In another embodiment, software code has instructions (either programmer defined or through binary instrumentation) to initiate a cache flush slightly in advance of global commit, so there is less dirty data present in the processor cache. This can be staged by flushing several chunks of the processor cache over a period of time.

Figure 5:
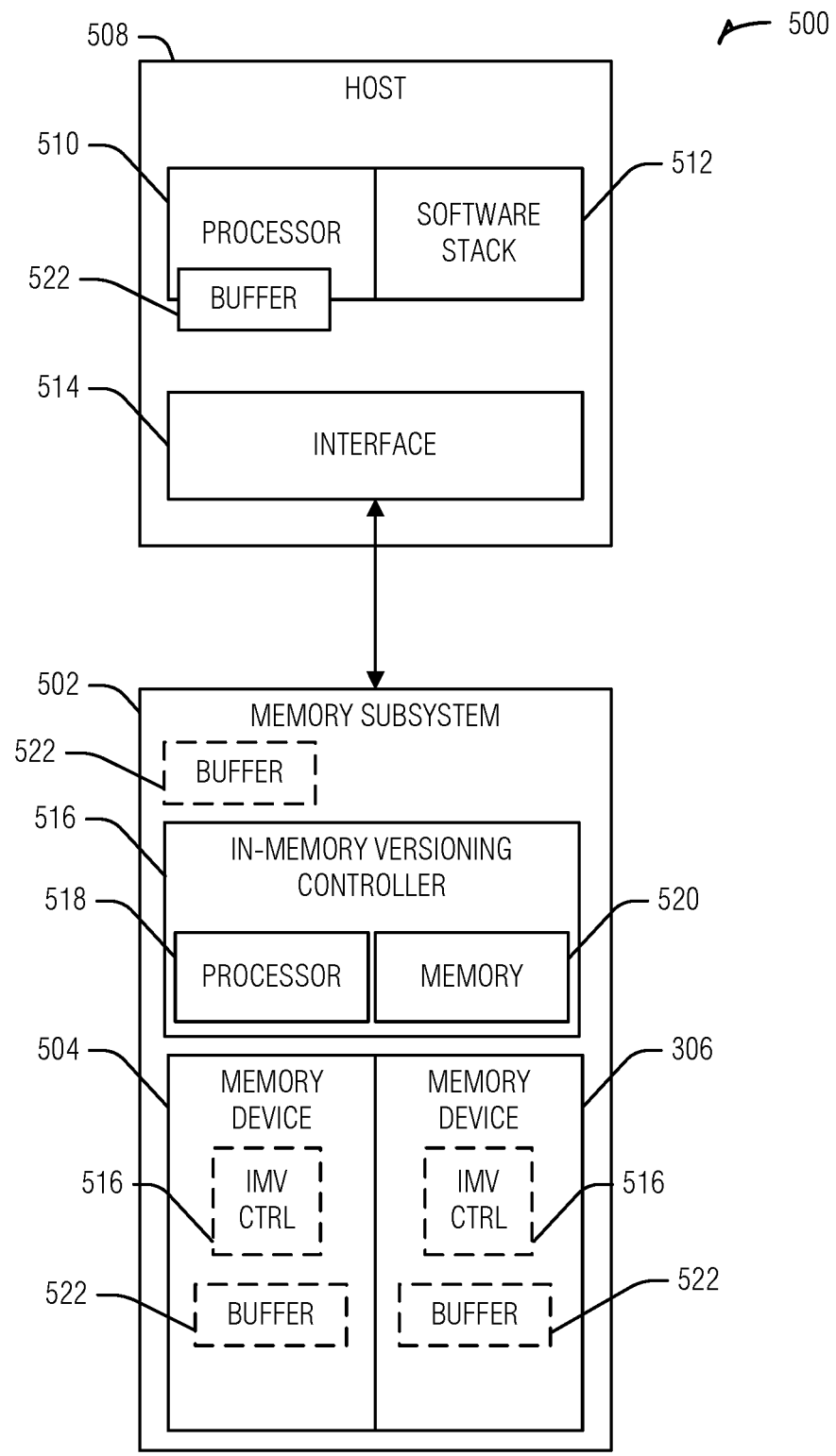
FIG. 5 illustrates an example computing system that includes a memory subsystem, according to embodiments.

In another embodiment, a hardware buffer is used as a write cache between the processor cache and the memory devices. FIG. 5 illustrates an example computing system 500 that includes a memory subsystem 502, according to embodiments. The memory subsystem 502 can be similar or the same as memory subsystem 302 of FIG. 3. The memory subsystem 502 can include media, such as one or more volatile memory devices (e.g., memory device 504), one or more non-volatile memory devices (e.g., memory device 506), or a combination of such. The memory subsystem 502 can also include an IMV controller 516 (with processor 518 and memory 520), memory devices 504, 506, which can optionally include an IMV controller 516. The host 508 includes a processor 510, software stack 512, and interface 514, as described above with respect to 310, 312, and 314 in FIG. 3.

A hardware buffer 522 is included in the architecture illustrated in FIG. 5. The hardware buffer 522 can be a tagged "write cache" near the host cache or in fast local memory (e.g., SRAM, HBM, or DDR DRAM). Alternatively, the hardware buffer 522 can be a reserved portion of the primary SRAM cache (e.g. L3). On a global commit, all dirty lines in a processor cache and their addresses are quickly transferred to the hardware buffer 522, for write back to a memory device 504, 506 by the IMV controller 516 (e.g., a dirty data unit in a row buffer of memory device 504).

The host processor 510 marks those cache lines as clean in its own processor cache. The hardware buffer 522 starts to drain its modified data to memory 504, 506 from the hardware buffer 522 while the host 508 resumes using its processor cache. During the draining period, the host is not allowed to start more than one global commit.

Figure 6:
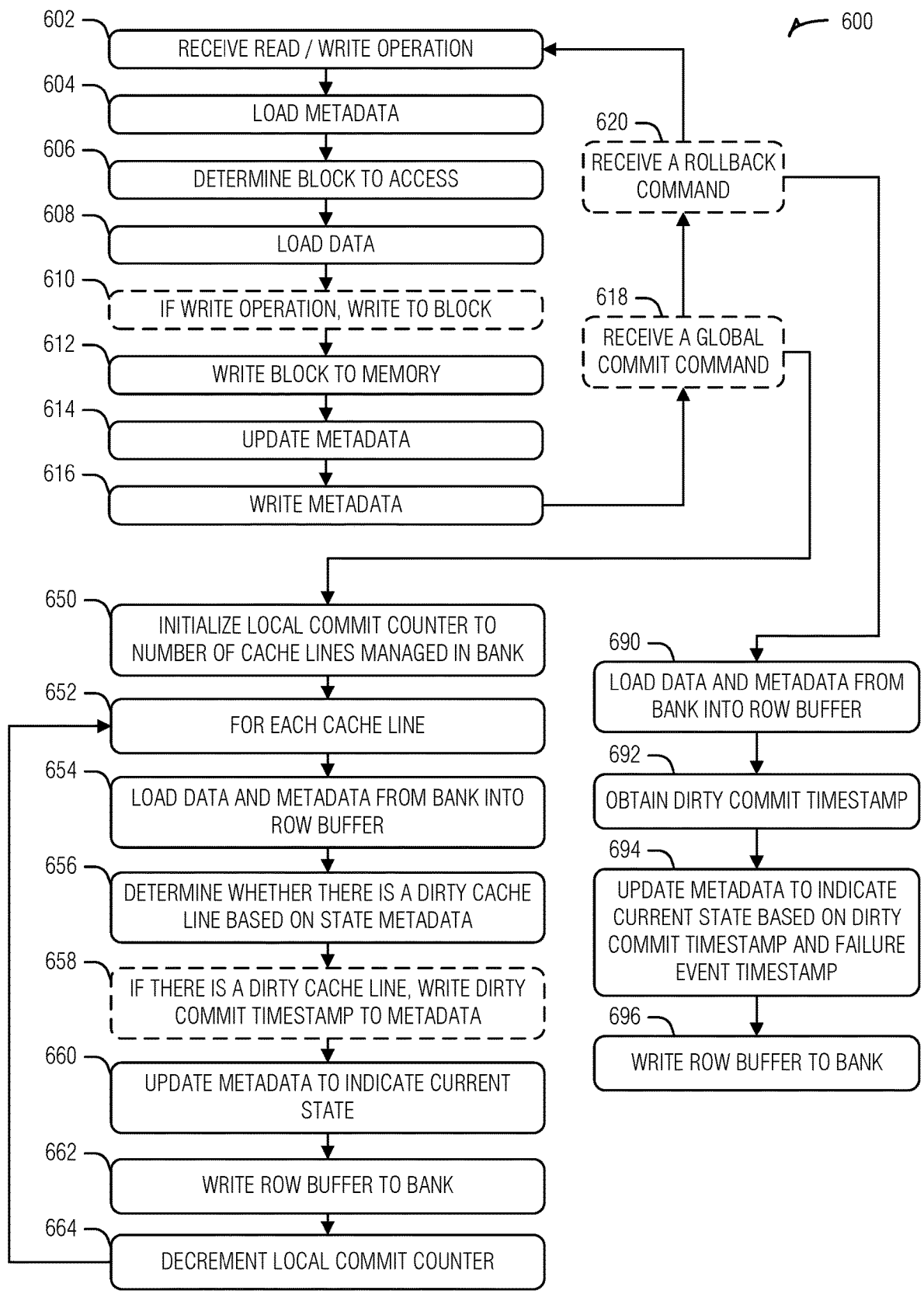
FIG. 6 is a flowchart illustrating an example method 600 for in-memory versioning, according to embodiments.

FIG. 6 is a flowchart illustrating an example method 600 for in-memory versioning, according to embodiments. The method 600 can be performed by processing logic that can include hardware (e.g., processing device, circuitry, dedicated logic, programmable logic, microcode, hardware of a device, integrated circuit, etc.). In some embodiments, the method 600 is performed by the IMV controller 316 of FIG. 3 or IMV controller 516 of FIG. 5.

The main loop is conducted with operations 602-616. At 602, a read or write operation is received at a memory device. The read/write operation is for a logical address. At 604, metadata is loaded from a memory bank into a row buffer. The metadata includes a dirty commit timestamp indicating the last time the dirty block was committed, and state metadata indicating a state of the data units as per the state machine described in FIG. 2. Based on the type of memory operation (e.g., read or write) and the metadata, one or more of the data units are accessed according to the controller state machine. All three data units (e.g., A, B and C) are not necessarily all loaded or required on every incoming request. The correct data unit is determined based on the state data and the type of operation (read/write), at operation 606.

The appropriate data unit(s) is loaded from its memory bank into the row buffer (operation 608). If the memory operation is a write operation, the data from the memory operation is written to the appropriate data unit in the row buffer (operation 610). The row buffer with the data unit is then written out to the appropriate memory bank (operation 612). The metadata is updated based on the type of memory operation and current state is saved to the metadata (operation 614). The metadata is then written out to the appropriate memory bank from the row buffer (operation 616). It should be noted that the metadata and block data may be stored in the same memory bank in some implementations (i.e., the metadata is stored with a data unit) or different memory banks (i.e., the metadata is stored separate from the data units).

Global commit commands and rollback commands can be received by the IMV controller asynchronously with the main loop (operations 602-616). When a global commit command is received (operation 618), then the method 600 transitions to operation 650, where a local commit counter is initialized to the number of cache lines managed by the IMV controller in the memory bank. For each cache line (operation 652), the data and metadata are loaded into the row buffers (operation 654) and it is determined whether a dirty cache line exists based on the state metadata (operation 656). If there is a dirty cache line, then the dirty cache line is committed by storing the current time as a dirty commit timestamp into the metadata (operation 658). The state metadata is updated to indicate the current state after commit (operation 660) and the row buffer is written out (operation 662). The local commit counter is decremented (operation 664) and the loop iterates by going back to operation 652.

As similarly described elsewhere herein, if there are reads or writes during a global commit operation, then they can be handled based on the current state (e.g., operations 604 and 606) and the state machine is updated in the state metadata (e.g., operations 614 and 616). This is performed asynchronously to the global commit operation (operations 650-664).

If there is a rollback command (operation 620), then the data and metadata for the cache line(s) that are rolled back are loaded into the row buffer (operation 690). It is understood that the rollback operations 690-696 can be used multiple times for multiple cache lines that are rolled back. The dirty commit timestamp is obtained from the metadata (operation 692) and the state metadata is updated based on a comparison between the dirty commit timestamp and the timestamp of the failure event that caused the rollback to occur (operation 694). After the metadata is updated, the data and metadata is written back to the bank (operation 696). Again, similar to the global commit command, the rollback command operates asynchronously to the main loop (operations 602-616).

Figure 7:
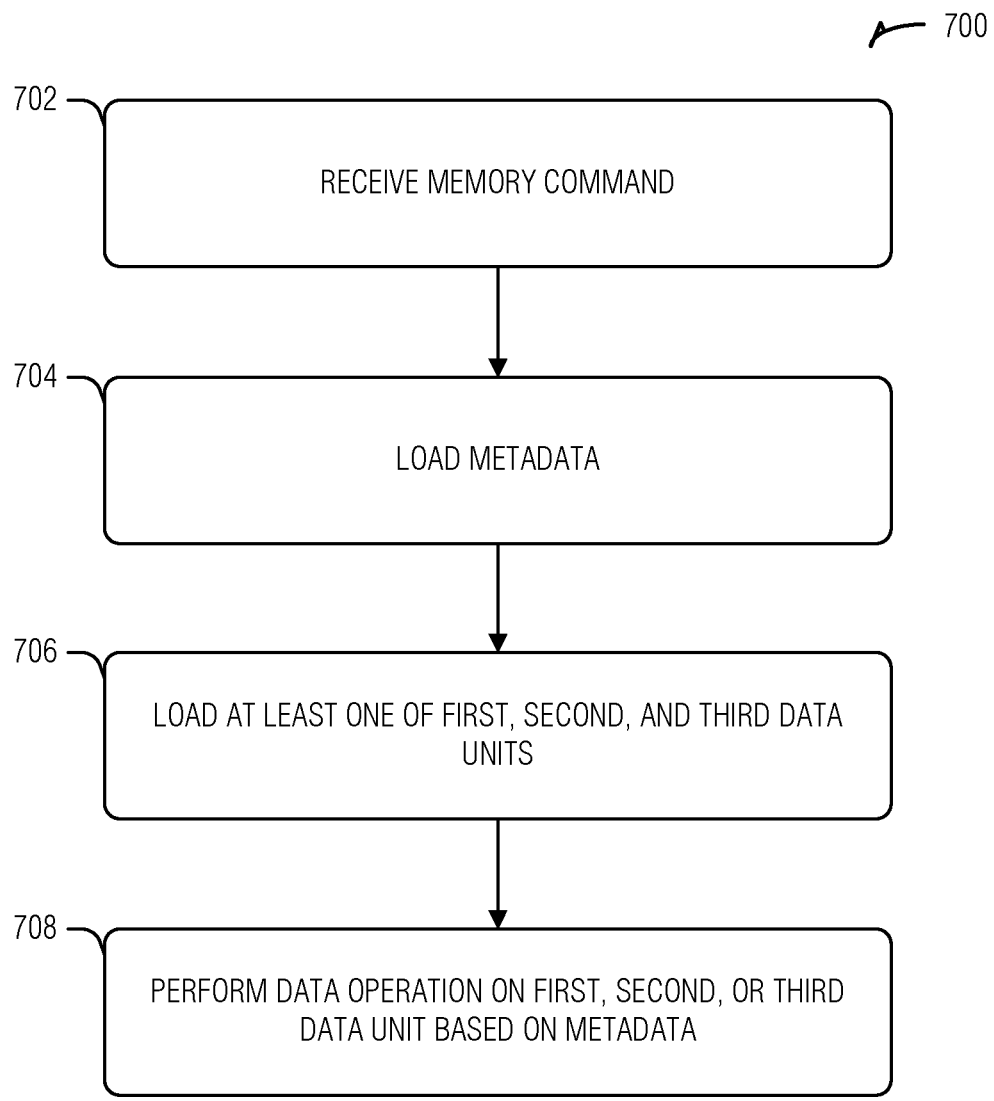
FIG. 7 is a flowchart illustrating an example method for versioning stored data on a memory device, in accordance with some embodiments.

FIG. 7 is a flowchart illustrating an example method 700 for versioning stored data on a memory device, in accordance with some embodiments. The method 700 can be performed by processing logic that can include hardware (e.g., processing device, circuitry, dedicated logic, programmable logic, microcode, hardware of a device, integrated circuit, etc.). In some embodiments, the method 700 is performed by the IMV controller 316 of FIG. 3 or IMV controller 516 of FIG. 5.

At operation 702, a processing device (e.g., the processor 318 of the memory subsystem controller 316) receives from a host system (e.g., 308) a first memory command associated with a logical memory address, the logical memory address mapped to a set of physical memory locations of the memory device, the set of physical locations being of a first data unit, a second data unit, and a third data unit on the memory device.

At operation 704, metadata associated with the first, second, and third data unit is loaded. The metadata includes state information and a dirty commit timestamp. In an embodiment, the state information is a 4-bit encoding representing one of nine possible states. In an embodiment, the nine possible states include a clean first data unit, a dirty first data unit, a speculative first data unit, a clean second data unit, a dirty second data unit, a speculative second data unit, a clean third data unit, a dirty third data unit, and a speculative third data unit, corresponding to a data state of the first, second, or third data unit.

At operation 706, the set of physical locations is used to load at least one of the first, second, and third data units into a row buffer. In an embodiment, the first data unit is stored on a first bank of the memory device, and the second data unit is stored on a second bank of the memory device.

At operation 708, a data operation is performed on the first, second, or third data unit based on the state information and the dirty commit timestamp.

In an embodiment, the first memory command is a write memory command to store a data value, and performing the data operation includes determining from the state information whether the first data unit is in a clean state, dirty state, or speculative state, and conditionally storing the data value to the first data unit or second data unit depending on the state information. In a further embodiment, the method 700 includes modifying the state information in response to writing the data value to the first data unit to indicate that the second data unit is in a dirty state.

In an embodiment, the first memory command is a global commit operation, and performing the data operation includes determining from the state information whether the first data unit is in a clean state, dirty state, or speculative state, conditionally modifying the state information based on whether the first data unit is in the clean state, dirty state, or speculative state, and updating the dirty commit timestamp with a current time. In a further embodiment, the method 700 includes receiving, from the host system, a write memory command to store a data value, and in response to receiving the second memory command, storing the data value in the first, second, or third data unit based on the state information and the time the write memory command was issued. In another embodiment, when the state information indicates that the first data unit is in a clean state and the write memory command was issued before the global commit operation was issued, the data value is stored in the second data unit and the state information is saved to indicate a "dirty second data unit" state.

In another embodiment, when the state information indicates that the first data unit is in a clean state and the write memory command was issued after the global commit operation was issued, the data value is stored in the second data unit and the state information is saved to indicate a "speculative third data unit" state.

In another embodiment, when the state information indicates that the first data unit is in a dirty state and the write memory command was issued before the global commit operation was issued, the data value is stored in the first data unit and the state information is saved to indicate a "dirty first data unit" state.

In another embodiment, when the state information indicates that the first data unit is in a dirty state and the write memory command was issued after the global commit operation was issued, the data value is stored in the second data unit and the state information is saved to indicate a "speculative second data unit" state.

In another embodiment, when the state information indicates that the first data unit is in a speculative state and the write memory command was issued before the global commit operation was issued, the data value is stored in the first data unit and the state information is saved to indicate a "speculative first data unit" state.

In another embodiment, when the state information indicates that the first data unit is in a speculative state and the write memory command was issued after the global commit operation was issued, the data value is stored in the second data unit and the state information is saved to indicate a "speculative first data unit" state.

In an embodiment, the first memory command is a rollback operation due to a failure event having a failure timestamp, and performing the data operation includes determining from the state information whether the first data unit is in a clean state, dirty state, or speculative state, and conditionally modifying the state information based on whether the first data unit is in the clean state, dirty state, or speculative state and the dirty commit timestamp. In another embodiment, when the state information indicates that the first data unit is in a clean state and the failure timestamp is after the dirty commit timestamp, the state information is saved to indicate a "clean first data unit" state.

In another embodiment, when the state information indicates that the first data unit is in a clean state and the failure timestamp is before the dirty commit timestamp, the state information is saved to indicate a "clean third data unit" state.

In another embodiment, when the state information indicates that the first data unit is in a dirty state and the failure timestamp is after the dirty commit timestamp, the state information is saved to indicate a "clean third data unit" state.

In another embodiment, when the state information indicates that the first data unit is in a dirty state and the failure timestamp is before the dirty commit timestamp, the state information is saved to indicate a "clean second data unit" state.

In another embodiment, when the state information indicates that the first data unit is in a speculative state and the failure timestamp is after the dirty commit timestamp, the state information is saved to indicate a "clean third data unit" state.

In another embodiment, when the state information indicates that the first data unit is in a speculative state and the failure timestamp is before the dirty commit timestamp, the state information is saved to indicate a "clean second data unit" state.

Although shown in a particular sequence or order, unless otherwise specified, the order of the methods or processes described herein can be modified. Thus, the illustrated embodiments should be understood only as examples, and the illustrated processes can be performed in a different order, and some processes can be performed in parallel. Additionally, one or more processes can be omitted in various embodiments. Thus, not all processes are used in every embodiment. Other process flows are possible.

Figure 8:
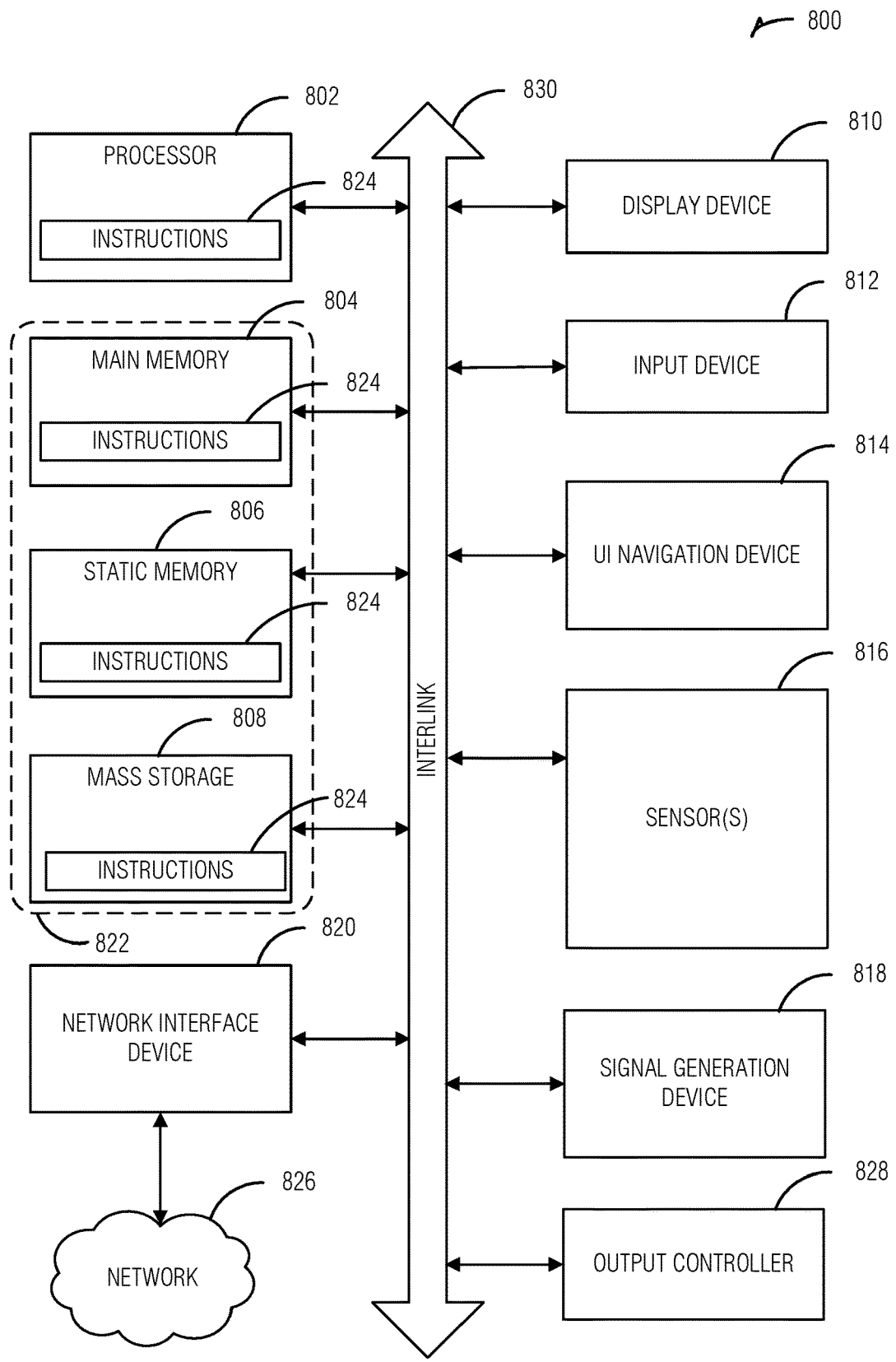
FIG. 8 illustrates a block diagram of an example machine with which, in which, or by which any one or more of the techniques (e.g., methodologies) discussed herein can be implemented.

FIG. 8 illustrates a block diagram of an example machine 800 with which, in which, or by which any one or more of the techniques (e.g., methodologies) discussed herein can be implemented. Examples, as described herein, can include, or can operate by, logic or a number of components, or mechanisms in the machine 800. Circuitry (e.g., processing circuitry) is a collection of circuits implemented in tangible entities of the machine 800 that include hardware (e.g., simple circuits, gates, logic, etc.). Circuitry membership can be flexible over time. Circuitries include members that can, alone or in combination, perform specified operations when operating. In an example, hardware of the circuitry can be immutably designed to carry out a specific operation (e.g., hardwired). In an example, the hardware of the circuitry can include variably connected physical components (e.g., execution units, transistors, simple circuits, etc.) including a machine readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine-readable medium elements are part of the circuitry or are communicatively coupled to the other components of the circuitry when the device is operating. In an example, any of the physical components can be used in more than one member of more than one circuitry. For example, under operation, execution units can be used in a first circuit of a first circuitry at one point in time and reused by a second circuit in the first circuitry, or by a third circuit in a second circuitry at a different time. Additional examples of these components with respect to the machine 800.

In alternative embodiments, the machine 800 can operate as a standalone device or can be connected (e.g., networked) to other machines. In a networked deployment, the machine 800 can operate in the capacity of a server machine, a client machine, or both in server-client network environments. In an example, the machine 800 can act as a peer machine in peer-to-peer (P2P) (or other distributed) network environment. The machine 800 can be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine 800 (e.g., computer system) can include a hardware processor 802 (e.g., a central processing unit (CPU), a graphics processing unit (GPU), a hardware processor core, or any combination thereof), a main memory 804, a static memory 806 (e.g., memory or storage for firmware, microcode, a basic-input-output (BIOS), unified extensible firmware interface (UEFI), etc.), and mass storage device 808 (e.g., hard drives, tape drives, flash storage, or other block devices) some or all of which can communicate with each other via an interlink 830 (e.g., bus). The machine 800 can further include a display device 810, an alphanumeric input device 812 (e.g., a keyboard), and a user interface (UI) Navigation device 814 (e.g., a mouse). In an example, the display device 810, the input device 812, and the UI navigation device 814 can be a touch screen display. The machine 800 can additionally include a mass storage device 808 (e.g., a drive unit), a signal generation device 818 (e.g., a speaker), a network interface device 820, and one or more sensor(s) 816, such as a global positioning system (GPS) sensor, compass, accelerometer, or other sensor. The machine 800 can include an output controller 828, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

Registers of the hardware processor 802, the main memory 804, the static memory 806, or the mass storage device 808 can be, or include, a machine-readable media 822 on which is stored one or more sets of data structures or instructions 824 (e.g., software) embodying or used by any one or more of the techniques or functions described herein. The instructions 824 can also reside, completely or at least partially, within any of registers of the hardware processor 802, the main memory 804, the static memory 806, or the mass storage device 808 during execution thereof by the machine 800. In an example, one or any combination of the hardware processor 802, the main memory 804, the static memory 806, or the mass storage device 808 can constitute the machine-readable media 822. While the machine-readable media 822 is illustrated as a single medium, the term "machine-readable medium" can include a single medium or multiple media (e.g., a centralized or distributed database, or associated caches and servers) configured to store the one or more instructions 824.

The term "machine readable medium" can include any medium that is capable of storing, encoding, or carrying instructions for execution by the machine 800 and that cause the machine 800 to perform any one or more of the techniques of the present disclosure, or that is capable of storing, encoding or carrying data structures used by or associated with such instructions. Non-limiting machine-readable medium examples can include solid-state memories, optical media, magnetic media, and signals (e.g., radio frequency signals, other photon-based signals, sound signals, etc.). In an example, a non-transitory machine-readable medium comprises a machine-readable medium with a plurality of particles having invariant (e.g., rest) mass, and thus are compositions of matter. Accordingly, non-transitory machine-readable media are machine readable media that do not include transitory propagating signals. Specific examples of non-transitory machine readable media can include: non-volatile memory, such as semiconductor memory devices (e.g., electrically programmable read-only memory (EPROM), electrically erasable programmable read-only memory (EEPROM)) and flash memory devices; magnetic disks, such as internal hard disks and removable disks; magneto-optical disks; and CD-ROM and DVD-ROM disks.

In an example, information stored or otherwise provided on the machine-readable media 822 can be representative of the instructions 824, such as instructions 824 themselves or a format from which the instructions 824 can be derived. This format from which the instructions 824 can be derived can include source code, encoded instructions (e.g., in compressed or encrypted form), packaged instructions (e.g., split into multiple packages), or the like. The information representative of the instructions 824 in the machine-readable media 822 can be processed by processing circuitry into the instructions to implement any of the operations discussed herein. For example, deriving the instructions 824 from the information (e.g., processing by the processing circuitry) can include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions 824.

In an example, the derivation of the instructions 824 can include assembly, compilation, or interpretation of the information (e.g., by the processing circuitry) to create the instructions 824 from some intermediate or preprocessed format provided by the machine-readable media 822. The information, when provided in multiple parts, can be combined, unpacked, and modified to create the instructions 824. For example, the information can be in multiple compressed source code packages (or object code, or binary executable code, etc.) on one or several remote servers. The source code packages can be encrypted when in transit over a network and decrypted, uncompressed, assembled (e.g., linked) if necessary, and compiled or interpreted (e.g., into a library, stand-alone executable etc.) at a local machine, and executed by the local machine.

The instructions 824 can be further transmitted or received over a communications network 826 using a transmission medium via the network interface device 820 utilizing any one of a number of transfer protocols (e.g., frame relay, internet protocol (IP), transmission control protocol (TCP), user datagram protocol (UDP), hypertext transfer protocol (HTTP), etc.). Example communication networks can include a local area network (LAN), a wide area network (WAN), a packet data network (e.g., the Internet), mobile telephone networks (e.g., cellular networks), plain old telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 820 can include one or more physical jacks (e.g., Ethernet, coaxial, or phone jacks) or one or more antennas to connect to the network 826. In an example, the network interface device 820 can include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 800, and includes digital or analog communications signals or other intangible medium to facilitate communication of such software. A transmission medium is a machine readable medium.

To better illustrate the methods and apparatuses described herein, a non-limiting set of Example embodiments are set forth below as numerically identified Examples.

Example 1 is a memory subsystem comprising: a memory device configured to store a first data unit, a second data unit, and a third data unit, wherein the first, second, and third data units have a set of physical memory locations on the memory device, and metadata associated with the first, second, and third data units, the metadata including state information and a dirty commit timestamp; and a processing device, operatively coupled to the memory device, the processing device configured to: receive, from a host system, a first memory command associated with a logical memory address, the logical memory address mapped to the set of physical memory locations of the memory device; and in response to receiving the first memory command, perform a data operation on the first, second, or third data unit based on the state information and the dirty commit timestamp.

In Example 2, the subject matter of Example 1 includes, wherein the first data unit is stored on a first bank of the memory device, and the second data unit is stored on a second bank of the memory device.

In Example 3, the subject matter of Examples 1-2 includes, wherein the state information is a 4-bit encoding representing one of nine possible states.

In Example 4, the subject matter of Example 3 includes, wherein the nine possible states include a clean first data unit, a dirty first data unit, a speculative first data unit, a clean second data unit, a dirty second data unit, a speculative second data unit, a clean third data unit, a dirty third data unit, and a speculative third data unit, corresponding to a data state of the first, second, or third data unit.

In Example 5, the subject matter of Examples 1-4 includes, wherein the first memory command comprises a write memory command to store a data value, and wherein to perform the data operation, the processing device is configured to: determine from the state information whether the first data unit is in a clean state, dirty state, or speculative state; and conditionally store the data value to the first data unit or second data unit depending on the state information.

In Example 6, the subject matter of Example 5 includes, wherein the processing device is configured to modify the state information in response to writing the data value to the first data unit to indicate that the second data unit is in a dirty state.

In Example 7, the subject matter of Examples 1-6 includes, wherein the first memory command comprises a global commit operation, and wherein to perform the data operation, the processing device is configured to: determine from the state information whether the first data unit is in a clean state, dirty state, or speculative state; conditionally modify the state information based on whether the first data unit is in the clean state, dirty state, or speculative state; and update the dirty commit timestamp with a current time.

In Example 8, the subject matter of Example 7 includes, wherein the processing device is configured to: receive, from the host system, a write memory command to store a data value; and in response to receiving the second memory command, store the data value in the first, second, or third data unit based on the state information and the time the write memory command was issued.

In Example 9, the subject matter of Example 8 includes, wherein when the state information indicates that the first data unit is in a clean state and the write memory command was issued before the global commit operation was issued, the data value is stored in the second data unit and the state information is saved to indicate a "dirty second data unit" state.

In Example 10, the subject matter of Examples 8-9 includes, wherein when the state information indicates that the first data unit is in a clean state and the write memory command was issued after the global commit operation was issued, the data value is stored in the second data unit and the state information is saved to indicate a "speculative third data unit" state.

In Example 11, the subject matter of Examples 8-10 includes, wherein when the state information indicates that the first data unit is in a dirty state and the write memory command was issued before the global commit operation was issued, the data value is stored in the first data unit and the state information is saved to indicate a "dirty first data unit" state.

In Example 12, the subject matter of Examples 8-11 includes, wherein when the state information indicates that the first data unit is in a dirty state and the write memory command was issued after the global commit operation was issued, the data value is stored in the second data unit and the state information is saved to indicate a "speculative second data unit" state.

In Example 13, the subject matter of Examples 8-12 includes, wherein when the state information indicates that the first data unit is in a speculative state and the write memory command was issued before the global commit operation was issued, the data value is stored in the first data unit and the state information is saved to indicate a "speculative first data unit" state.

In Example 14, the subject matter of Examples 8-13 includes, wherein when the state information indicates that the first data unit is in a speculative state and the write memory command was issued after the global commit operation was issued, the data value is stored in the second data unit and the state information is saved to indicate a "speculative first data unit" state.

In Example 15, the subject matter of Examples 1-14 includes, wherein the first memory command comprises a rollback operation due to a failure event having a failure timestamp, and wherein to perform the data operation, the processing device is configured to: determine from the state information whether the first data unit is in a clean state, dirty state, or speculative state; and conditionally modify the state information based on whether the first data unit is in the clean state, dirty state, or speculative state and the dirty commit timestamp.

In Example 16, the subject matter of Example 15 includes, wherein when the state information indicates that the first data unit is in a clean state and the failure timestamp is after the dirty commit timestamp, the state information is saved to indicate a "clean first data unit" state.

In Example 17, the subject matter of Examples 15-16 includes, wherein when the state information indicates that the first data unit is in a clean state and the failure timestamp is before the dirty commit timestamp, the state information is saved to indicate a "clean third data unit" state.

In Example 18, the subject matter of Examples 15-17 includes, wherein when the state information indicates that the first data unit is in a dirty state and the failure timestamp is after the dirty commit timestamp, the state information is saved to indicate a "clean third data unit" state.

In Example 19, the subject matter of Examples 15-18 includes, wherein when the state information indicates that the first data unit is in a dirty state and the failure timestamp is before the dirty commit timestamp, the state information is saved to indicate a "clean second data unit" state.

In Example 20, the subject matter of Examples 15-19 includes, wherein when the state information indicates that the first data unit is in a speculative state and the failure timestamp is after the dirty commit timestamp, the state information is saved to indicate a "clean third data unit" state.

In Example 21, the subject matter of Examples 15-20 includes, wherein when the state information indicates that the first data unit is in a speculative state and the failure timestamp is before the dirty commit timestamp, the state information is saved to indicate a "clean second data unit" state.

Example 22 is a method comprising: receiving, at a memory device from a host system, a first memory command associated with a logical memory address, the logical memory address mapped to a set of physical memory locations of the memory device, the set of physical locations being of a first data unit, a second data unit, and a third data unit on the memory device; loading metadata associated with the first, second, and third data units, the metadata including state information and a dirty commit timestamp; using the set of physical locations to load at least one of the first, second, and third data unit into a row buffer; and performing a data operation on the first, second, or third data unit based on the state information and the dirty commit timestamp.

In Example 23, the subject matter of Example 22 includes, wherein the first data unit is stored on a first bank of the memory device, and the second data unit is stored on a second bank of the memory device.

In Example 24, the subject matter of Examples 22-23 includes, wherein the state information is a 4-bit encoding representing one of nine possible states.

In Example 25, the subject matter of Example 24 includes, wherein the nine possible states include a clean first data unit, a dirty first data unit, a speculative first data unit, a clean second data unit, a dirty second data unit, a speculative second data unit, a clean third data unit, a dirty third data unit, and a speculative third data unit, corresponding to a data state of the first, second, or third data unit.

In Example 26, the subject matter of Examples 22-25 includes, wherein the first memory command comprises a write memory command to store a data value, and wherein performing the data operation comprises: determining from the state information whether the first data unit is in a clean state, dirty state, or speculative state; and conditionally storing the data value to the first data unit or second data unit depending on the state information.

In Example 27, the subject matter of Example 26 includes, modifying the state information in response to writing the data value to the first data unit to indicate that the second data unit is in a dirty state.

In Example 28, the subject matter of Examples 22-27 includes, wherein the first memory command comprises a global commit operation, and performing the data operation comprises: determining from the state information whether the first data unit is in a clean state, dirty state, or speculative state; conditionally modifying the state information based on whether the first data unit is in the clean state, dirty state, or speculative state; and updating the dirty commit timestamp with a current time.

In Example 29, the subject matter of Example 28 includes, receiving, from the host system, a write memory command to store a data value; and in response to receiving the second memory command, storing the data value in the first, second, or third data unit based on the state information and the time the write memory command was issued.

In Example 30, the subject matter of Example 29 includes, wherein when the state information indicates that the first data unit is in a clean state and the write memory command was issued before the global commit operation was issued, the data value is stored in the second data unit and the state information is saved to indicate a "dirty second data unit" state.

In Example 31, the subject matter of Examples 29-30 includes, wherein when the state information indicates that the first data unit is in a clean state and the write memory command was issued after the global commit operation was issued, the data value is stored in the second data unit and the state information is saved to indicate a "speculative third data unit" state.

In Example 32, the subject matter of Examples 29-31 includes, wherein when the state information indicates that the first data unit is in a dirty state and the write memory command was issued before the global commit operation was issued, the data value is stored in the first data unit and the state information is saved to indicate a "dirty first data unit" state.

In Example 33, the subject matter of Examples 29-32 includes, wherein when the state information indicates that the first data unit is in a dirty state and the write memory command was issued after the global commit operation was issued, the data value is stored in the second data unit and the state information is saved to indicate a "speculative second data unit" state.

In Example 34, the subject matter of Examples 29-33 includes, wherein when the state information indicates that the first data unit is in a speculative state and the write memory command was issued before the global commit operation was issued, the data value is stored in the first data unit and the state information is saved to indicate a "speculative first data unit" state.

In Example 35, the subject matter of Examples 29-34 includes, wherein when the state information indicates that the first data unit is in a speculative state and the write memory command was issued after the global commit operation was issued, the data value is stored in the second data unit and the state information is saved to indicate a "speculative first data unit" state.

In Example 36, the subject matter of Examples 22-35 includes, wherein the first memory command comprises a rollback operation due to a failure event having a failure timestamp, and wherein performing the data operation comprises: determining from the state information whether the first data unit is in a clean state, dirty state, or speculative state; and conditionally modifying the state information based on whether the first data unit is in the clean state, dirty state, or speculative state and the dirty commit timestamp.

In Example 37, the subject matter of Example 36 includes, wherein when the state information indicates that the first data unit is in a clean state and the failure timestamp is after the dirty commit timestamp, the state information is saved to indicate a "clean first data unit" state.

In Example 38, the subject matter of Examples 36-37 includes, wherein when the state information indicates that the first data unit is in a clean state and the failure timestamp is before the dirty commit timestamp, the state information is saved to indicate a "clean third data unit" state.

In Example 39, the subject matter of Examples 36-38 includes, wherein when the state information indicates that the first data unit is in a dirty state and the failure timestamp is after the dirty commit timestamp, the state information is saved to indicate a "clean third data unit" state.

In Example 40, the subject matter of Examples 36-39 includes, wherein when the state information indicates that the first data unit is in a dirty state and the failure timestamp is before the dirty commit timestamp, the state information is saved to indicate a "clean second data unit" state.

In Example 41, the subject matter of Examples 36-40 includes, wherein when the state information indicates that the first data unit is in a speculative state and the failure timestamp is after the dirty commit timestamp, the state information is saved to indicate a "clean third data unit" state.

In Example 42, the subject matter of Examples 36-41 includes, wherein when the state information indicates that the first data unit is in a speculative state and the failure timestamp is before the dirty commit timestamp, the state information is saved to indicate a "clean second data unit" state.

Example 43 is at least one machine-readable medium including instructions that, when executed by processing circuitry, cause the processing circuitry to perform operations to implement of any of Examples 1-42.

Example 44 is an apparatus comprising means to implement of any of Examples 1-42.

Example 45 is a system to implement of any of Examples 1-42.

Example 46 is a method to implement of any of Examples 1-42.

The above detailed description includes references to the accompanying drawings, which form a part of the detailed description. The drawings show, by way of illustration, specific embodiments in which the invention can be practiced. These embodiments are also referred to herein as "examples". Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" can include "A but not B," "B but not A," and "A and B," unless otherwise indicated. In the appended claims, the terms "including" and "in which" are used as the plain-English equivalents of the respective terms "comprising" and "wherein". Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) can be used in combination with each other. Other embodiments can be used, such as by one of ordinary skill in the art upon reviewing the above description. It is submitted with the understanding that it will not be used to interpret or limit the scope or meaning of the claims. Also, in the above Detailed Description, various features can be grouped together to streamline the disclosure. This should not be interpreted as intending that an unclaimed disclosed feature is essential to any claim. Rather, inventive subject matter can lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A memory subsystem comprising:
a memory device configured to store a first data unit, a second data unit, and a third data unit, wherein the first, second, and third data units have a set of physical memory locations on the memory device, and wherein the first, second, and third data units store respective versions of data, the respective versions including a clean version of the data indicating that the data is uncorrupted and checkpointed, a dirty version of the data indicating that the data has been updated from the clean version, and a speculative version of the data indicating that the data has been updated and is in process of being checkpointed, and wherein the first, second, and third data units store metadata including state information and a dirty commit timestamp of the data; and
a processing device, operatively coupled to the memory device, the processing device configured to:
receive, from a host system, a first memory command associated with a logical memory address, the logical memory address mapped to each of the set of physical memory locations of the memory device;
in response to receiving the first memory command, determine which of the set of physical memory locations to access based on the state information and the dirty commit timestamp; and
perform a data operation on the first, second, or third data unit based on the determination, wherein the first memory command comprises a rollback operation due to a failure event having a failure timestamp, and wherein to perform the data operation, the processing device is configured to:
determine from the state information whether the first data unit is in a clean state, a dirty state, or a speculative state; and
modify the state information of the first data unit to one of: the clean state, the dirty state, or the speculative state.

2. The memory subsystem of claim 1, wherein the first data unit is stored on a first bank of the memory device, and the second data unit is stored on a second bank of the memory device.

3. The memory subsystem of claim 1, wherein the state information is a 4-bit encoding representing one of nine states.

4. The memory subsystem of claim 3, wherein the nine states include a clean first data unit, a dirty first data unit, a speculative first data unit, a clean second data unit, a dirty second data unit, a speculative second data unit, a clean third data unit, a dirty third data unit, and a speculative third data unit, corresponding to a data state of the first, second, or third data unit.

5. The memory subsystem of claim 1, wherein the first memory command comprises a write memory command to store a data value, and wherein to perform the data operation, the processing device is configured to:
determine from the state information whether the first data unit is in a clean state, dirty state, or speculative state; and
conditionally store the data value to the first data unit or second data unit depending on the state information.

6. The memory subsystem of claim 5, wherein the processing device is configured to modify the state information in response to writing the data value to the first data unit to indicate that the second data unit is in a dirty state.

7. The memory subsystem of claim 1, wherein the first memory command comprises a global commit operation, and wherein to perform the data operation, the processing device is configured to:
determine from the state information whether the first data unit is in a clean state, dirty state, or speculative state;
conditionally modify the state information based on whether the first data unit is in the clean state, dirty state, or speculative state; and
update the dirty commit timestamp with a current time.

8. The memory subsystem of claim 7, wherein the processing device is configured to:
receive, from the host system, a write memory command to store a data value; and
in response to receiving the second memory command, store the data value in the first, second, or third data unit based on the state information and the time the write memory command was issued.

9. The memory subsystem of claim 8, wherein when the state information indicates that the first data unit is in a clean state and the write memory command was issued before the global commit operation was issued, the data value is stored in the second data unit, and the state information is updated to indicate that the second data unit is in the dirty state.

10. The memory subsystem of claim 8, wherein when the state information indicates that the first data unit is in a clean state and the write memory command was issued after the global commit operation was issued, the data value is stored in the second data unit and, the state information is updated to indicate that the third data unit is in the speculative state.

11. The memory subsystem of claim 8, wherein when the state information indicates that the first data unit is in a dirty state and the write memory command was issued before the global commit operation was issued, the data value is stored in the first data unit, and the state information is updated to indicate that the first data unit is in the dirty state.

12. The memory subsystem of claim 8, wherein when the state information indicates that the first data unit is in a dirty state and the write memory command was issued after the global commit operation was issued, the data value is stored in the second data unit, and the state information is updated to indicate that the second data unit is in the speculative state.

13. The memory subsystem of claim 8, wherein when the state information indicates that the first data unit is in a speculative state and the write memory command was issued before the global commit operation was issued, the data value is stored in the first data unit, and the state information is updated to indicate that the first data unit is in the speculative state.

14. The memory subsystem of claim 8, wherein when the state information indicates that the first data unit is in a speculative state and the write memory command was issued after the global commit operation was issued, the data value is stored in the second data unit, and the state information is updated to indicate that the first data unit is in the speculative state.

15. The memory subsystem of claim 1, wherein when the state information indicates that the first data unit is in a clean state and the failure timestamp is after the dirty commit timestamp, the state information is saved to indicate that the first data unit is in the clean state.

16. The memory subsystem of claim 1, wherein when the state information indicates that the first data unit is in a clean state and the failure timestamp is before the dirty commit timestamp, the state information is saved to indicate that the third data unit is in the clean state.

17. The memory subsystem of claim 1, wherein when the state information indicates that the first data unit is in a dirty state and the failure timestamp is after the dirty commit timestamp, the state information is saved to indicate that the third data unit is in the clean state.

18. The memory subsystem of claim 1, wherein when the state information indicates that the first data unit is in a dirty state and the failure timestamp is before the dirty commit timestamp, the state information is saved to indicate that the second data unit is in the clean state.

19. The memory subsystem of claim 1, wherein when the state information indicates that the first data unit is in a speculative state and the failure timestamp is after the dirty commit timestamp, the state information is saved to indicate that the third data unit is in the clean state.

20. The memory subsystem of claim 1, wherein when the state information indicates that the first data unit is in a speculative state and the failure timestamp is before the dirty commit timestamp, the state information is saved to indicate that the second data unit is in the clean state.

21. A method comprising:
receiving, at a memory device from a host system, a first memory command associated with a logical memory address, the logical memory address mapped to each of a set of physical memory locations of the memory device, the set of physical locations being of a first data unit, a second data unit, and a third data unit on the memory device, wherein the first, second, and third data units store respective versions of data, the respective versions including a clean version of the data indicating that the data is uncorrupted and checkpointed, a dirty version of the data indicating that the data has been updated from the clean version, and a speculative version of the data indicating that the data has been updated and is in process of being checkpointed;

using the set of physical locations to load the first, second, and third data unit into a row buffer;

loading metadata associated with the first, second, and third data units, the metadata including state information and a dirty commit timestamp of the data;

determining which of the first, second, or third data units to access based on the state information and the dirty commit timestamp; and performing a data operation on the first, second, or third data unit based on the determination, wherein the first memory command comprises a rollback operation due to a failure event having a failure timestamp, and wherein performing the data operation comprises:

determining from the state information whether the first data unit is in a clean state, a dirty state, or a speculative state; and modify the state information of the first data unit to one of: the clean state, the dirty state, or the speculative state.

22. The method of claim 21, wherein the first data unit is stored on a first bank of the memory device, and the second data unit is stored on a second bank of the memory device.

23. The method of claim 21, wherein the state information is a 4-bit encoding representing one of nine states.

* * * * *